United States Patent Office 2,697,607
Patented Dec. 21, 1954

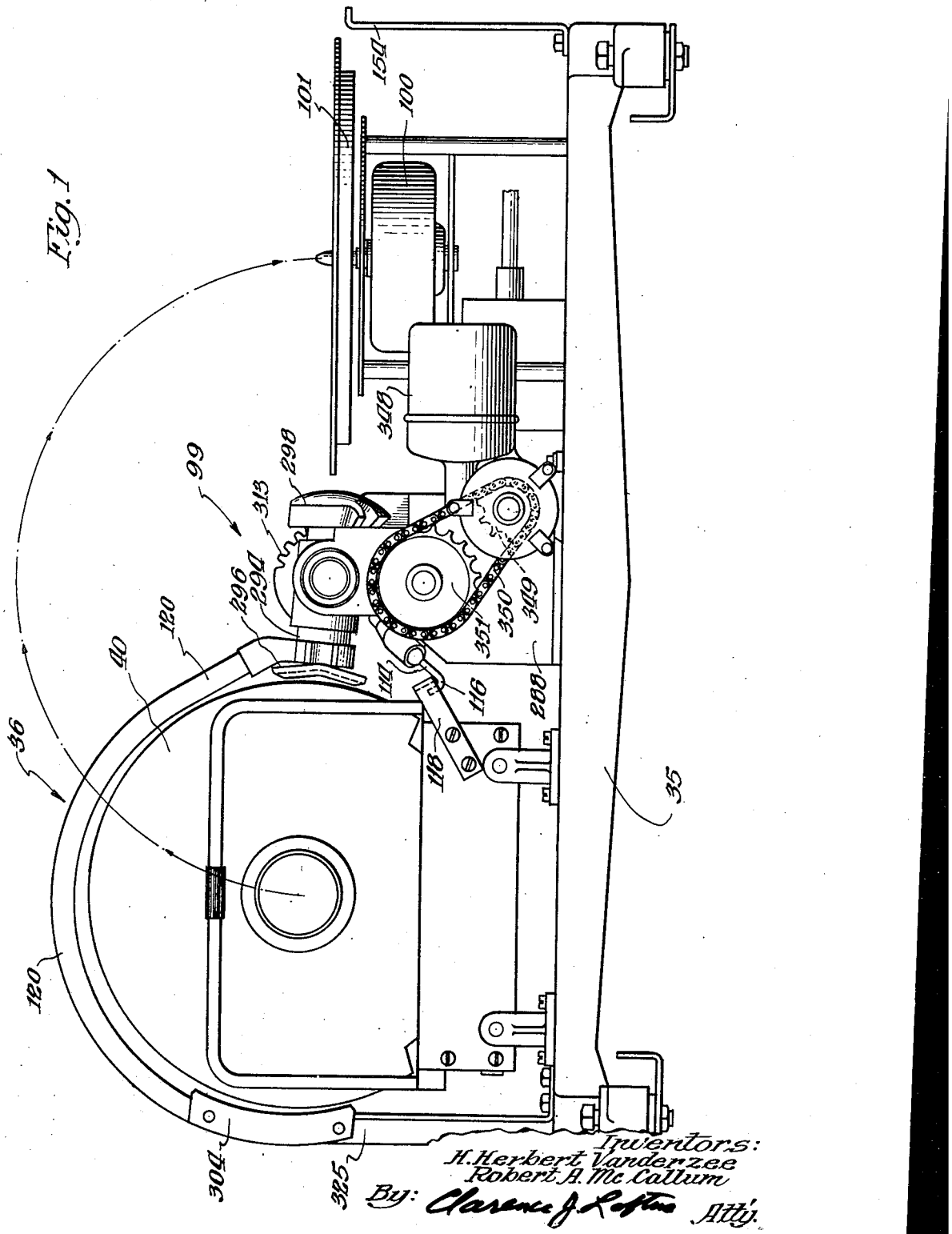

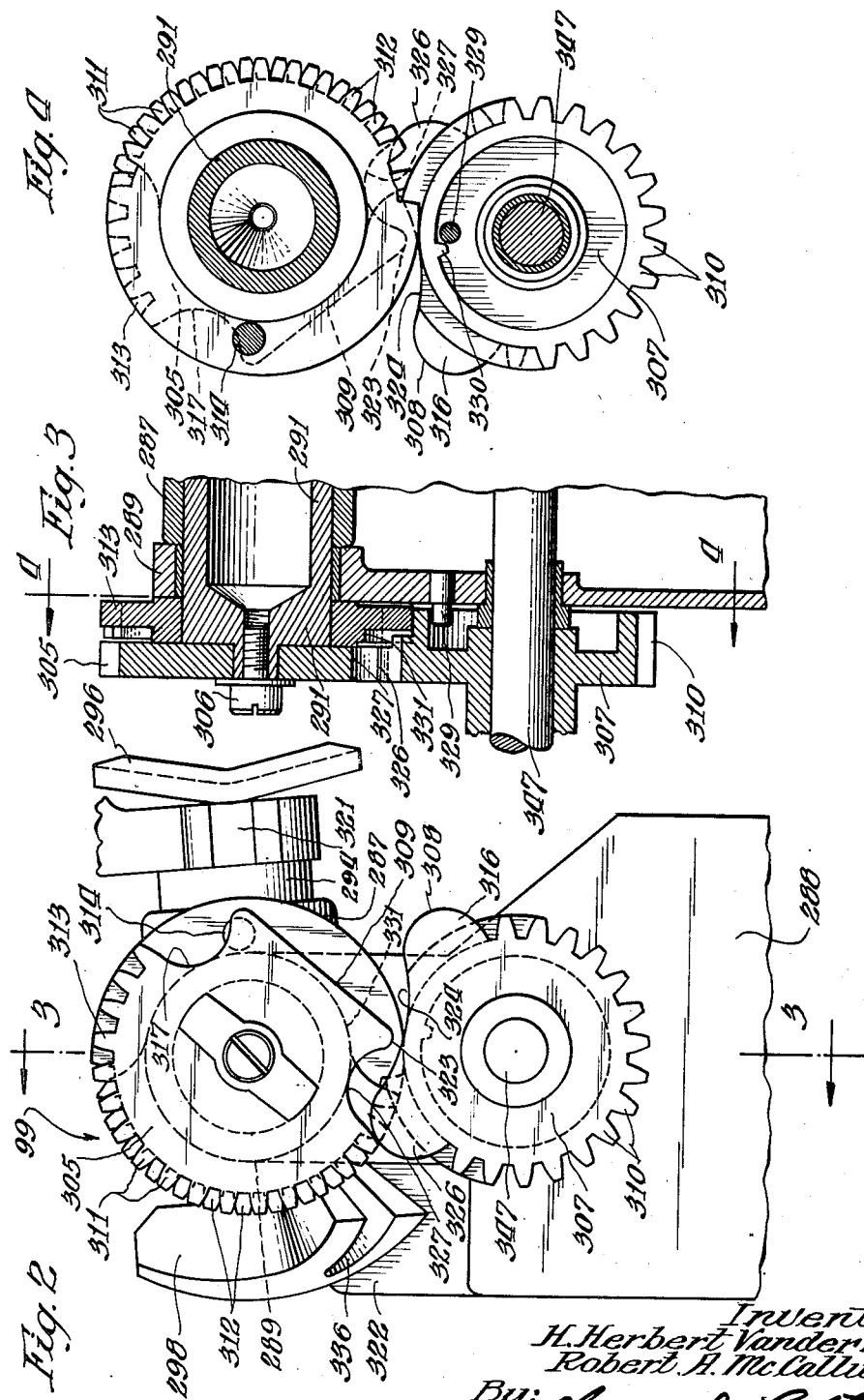

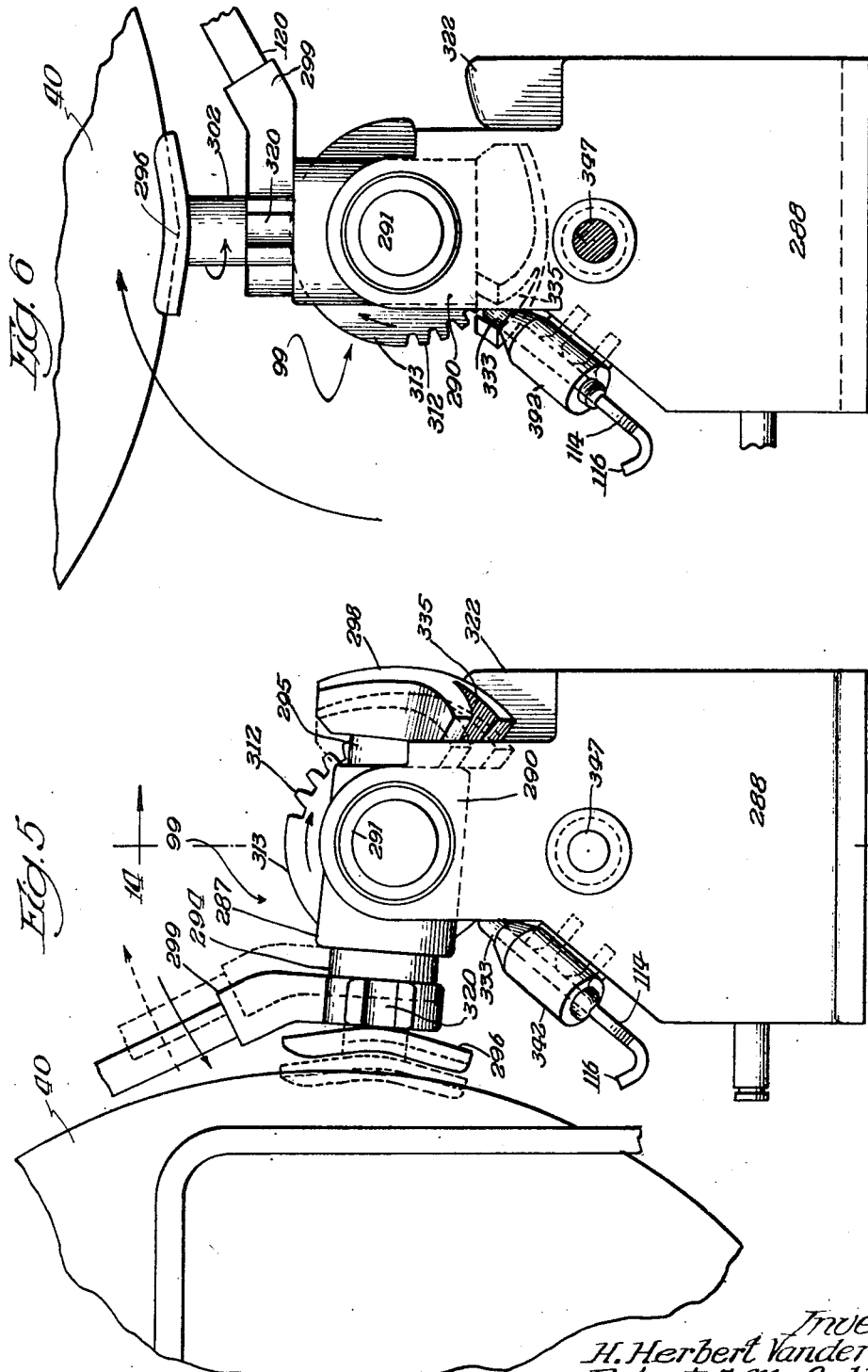

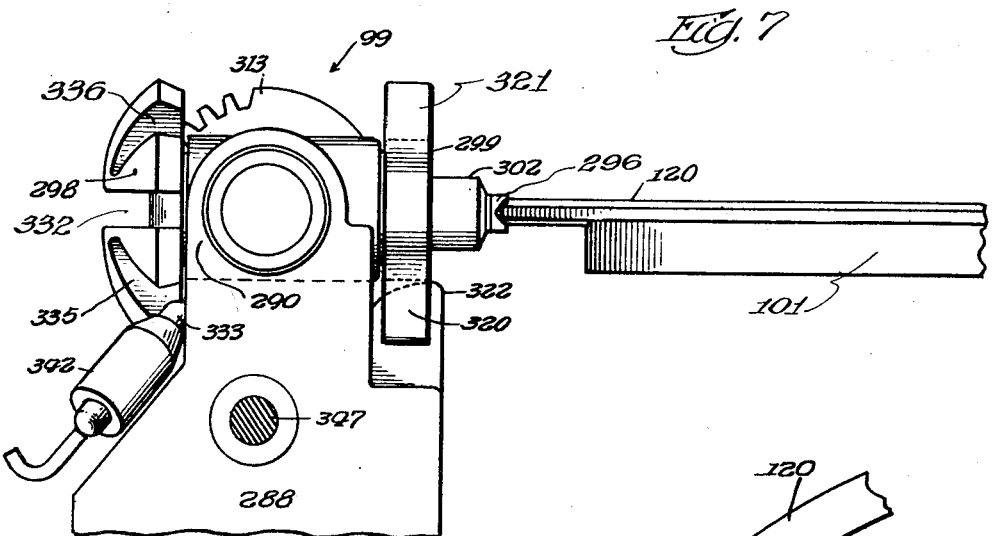

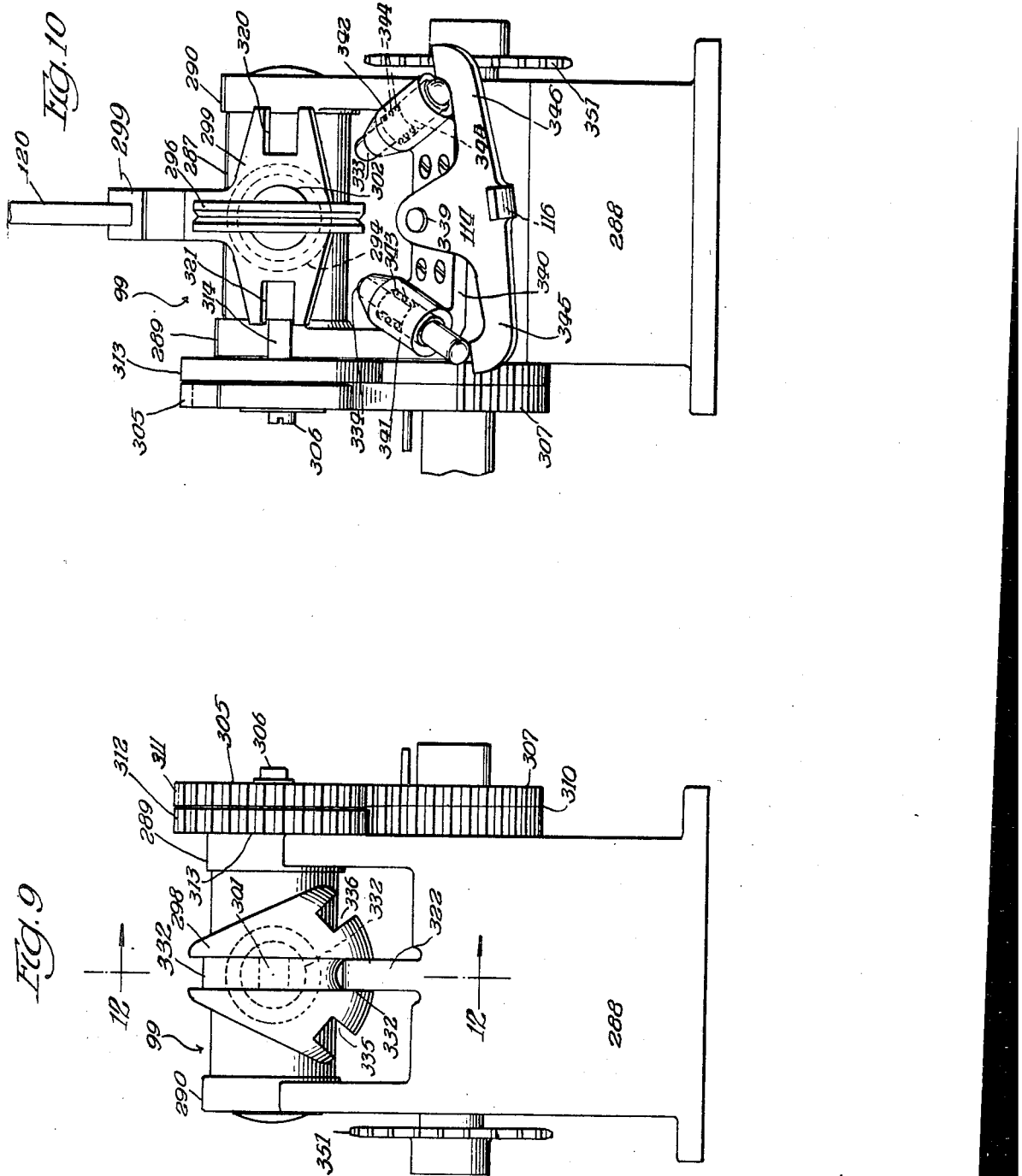

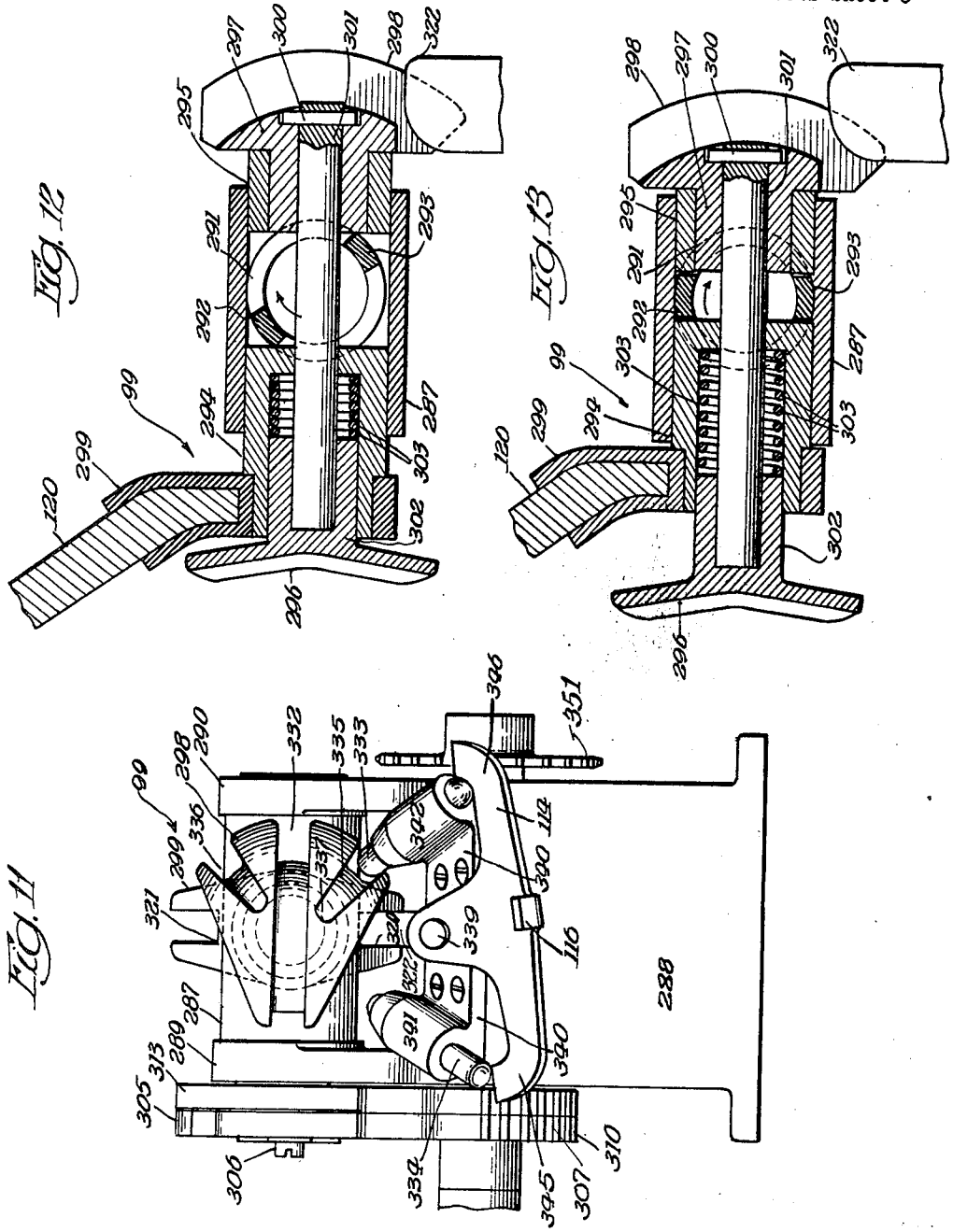

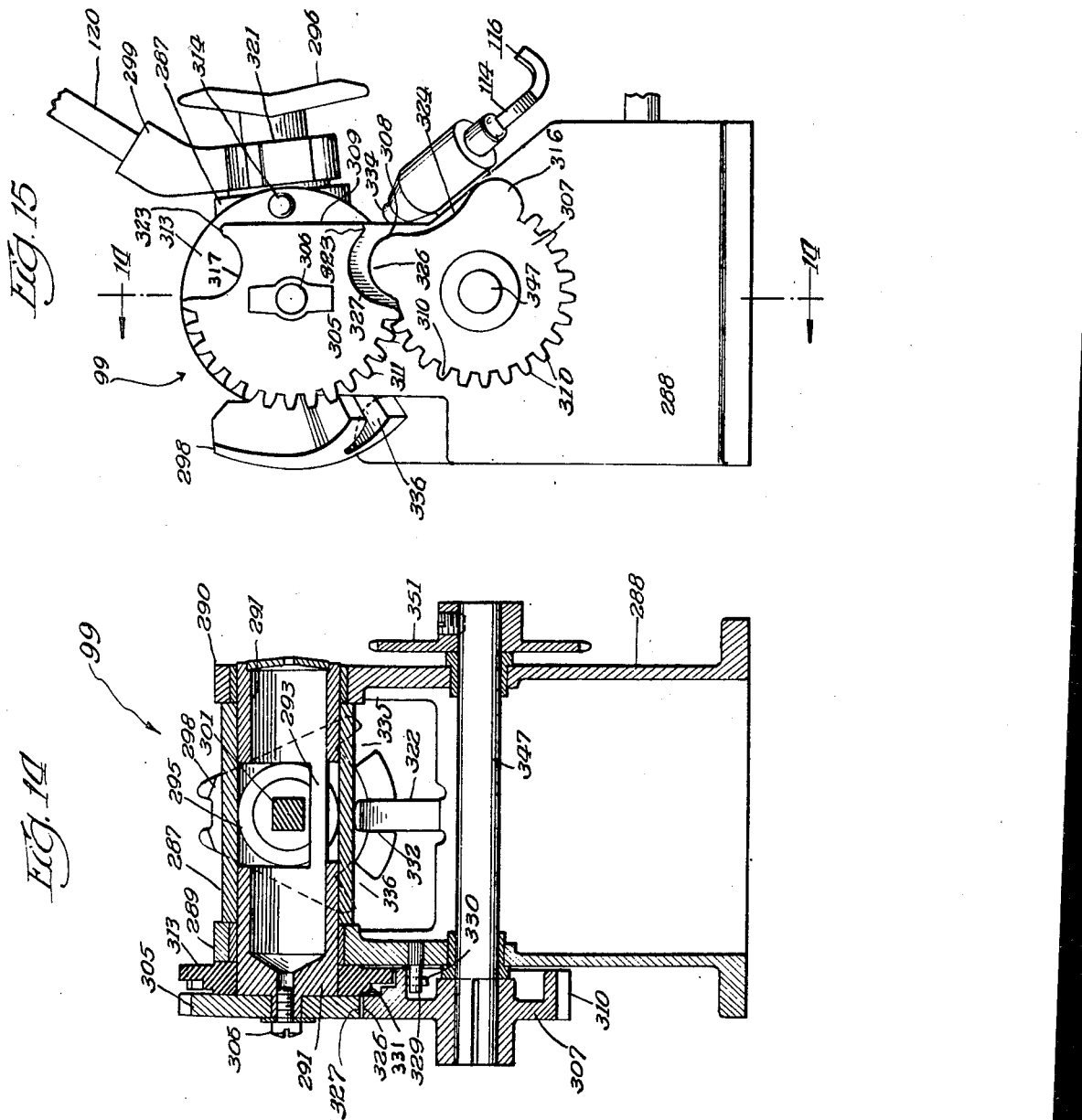

2,697,607

RECORD TRANSFER MECHANISM

Harry Herbert Vanderzee, Grand Rapids, Mich., and Robert A. McCallum, Clarendon Hills, Ill., assignors, by mesne assignments, to AMI Incorporated, a corporation of Delaware Original application October 21, 1946, Serial No. 704,588. Divided and this application January 26, 1951, Serial No. 207,951

5 Claims. (Cl. 274—10)

This specification is a division of our co-pending application Ser. No. 704,588, filed October 21, 1946, now U. S. Patent No. 2,666,649. The invention disclosed and claimed herein relates to automatic phonograph record changers of the general type disclosed in United States reissue patent Re. 21,514, and is particularly directed to a unique and improved record transfer mechanism for such record changers.

It has been pointed out in the parent specification that the broad functions of a record changer of the type under consideration here are to select a given record disc from a magazine, carry it to the transfer mechanism and to then transfer the record disc from the magazine to a playing turntable, at the same time turning one side or the other uppermost to furnish the desired program.

It is the general aim of the invention disclosed herein to provide a record transfer mechanism which is capable of smoother, quieter and more dependable operation than has been accomplished by transfer mechanisms of prior types, yet to achieve these desirable results with a simplified structure having fewer parts than heretofore, with the parts so related to each other as to eliminate the necessity for any critical adjustments. It is, at the same time, a primary aim to provide a record transfer mechanism of rugged, trouble-free construction, yet adapted to economical methods of manufacture.

The simultaneous achievement of these aims involves various aspects, since to be satisfactory for the practical use in the field, a device of this general character must be of such design and construction that it is not only capable of long continued, trouble-free operation under normal conditions, but is also capable of withstanding a considerable amount of mistreatment and abuse, and of such design and construction that it is not likely to be damaged by improper manipulation or inadequate care. It is also of considerable importance that the mechanism be so designed that the machine cannot easily be jammed or the proper sequence of operations of the various coacting parts cannot be easily disrupted, either by vibration or accidental physical shocks, by inadvertent improper manual adjustments of the machine, or by deliberate improper manipulation of the various operating parts.

It is therefore one of the primary objects of the present invention to provide a transfer mechanism of the type employing a circumferential transfer arm to encircle and cradle the record, with driving means for said arm so constructed that the arm is positively held against accidental displacement by external forces, not only as the arm is moved in the record transfer operation, but also when it is in a position of rest at the magazine or at the turntable.

A further object of the invention is the provision of a driving mechanism for such a record transfer arm wherein the meshing relationship between the driving gears is entirely smooth and positive, and wherein any possibility of jamming of the driving parts is eliminated.

A still further object of the invention resides in the provision of a transfer arm driving mechanism adapted for direct drive by a reversible electric motor, so that the record may be delivered to the turntable or returned to the magazine merely by reversing the direction of rotation of the motor. This involves provision of record grasping and releasing mechanisms which operate automatically with the movement of the driving mechanism of the transfer arm, and also requires the provision of a driving mechanism for the arm with its coacting parts so related that the starting and stopping points of the arm itself are precisely controlled, yet there is some leeway as to the exact point at which the driving mechanism may stop, so that extreme precision in the control of the motor is not required, and unduly critical adjustments are eliminated.

A still further object of the invention is the provision of a transfer arm driving mechanism wherein the functions of engaging the record and transporting it to the turntable and back are controlled in such a manner that all movements of the record are smoothly executed at uniform rates of acceleration and deceleration, so that the mechanism functions without appreciable strain on the record or shock to the working parts, and without perceptible operating noise.

The foregoing objects are accomplished according to the present teaching by a construction wherein the transfer arm of the record changer is carried on and supported by a tubular shaft which also functions as a cam to actuate the record gripping members. The several parts of the transfer arm are driven by a cluster of three gears of unique construction, so designed that overtravel of one of the gears with respect to another actuates a pair of cams, which causes the grippers carried by the transfer arm to automatically engage and release a record at the beginning and end of its stroke. Notwithstanding this, the several parts of the arm are so controlled by the gears that as they move together in the transfer operation they are positively locked against relative movement with respect to each other, and restrained against movement by accidental external forces throughout the entire arc in which the transfer arm swings. The arm is rotated in flight to place the other side of the record uppermost on the turntable by an improved "mushroom" control employing a pair of selective tapered pins coacting with grooves on the mushroom to establish line contact therewith, affording positive actuation yet assuring uniform acceleration and deceleration of the record and the moving parts of the arm.

The preferred embodiment of the present invention will be described in connection with the drawings of this specification, wherein:

Figure 1 is a front elevational view of a record changer of the general type contemplated here, with some of the selector and control mechanism removed to clarify the showing of the record transfer mechanism as contemplated by this invention;

Figure 2 is a rear elevational view of the record transfer mechanism in which the novelty of the present invention resides, showing the driving gears thereof at the position of rest which they assume when the transfer arm is encircling a record in the magazine but not as yet engaging the same;

Figure 3 is a detail sectional view through the driving gears of the record transfer mechanism, the view being taken substantially on the plane of the line 3—3 of Figure 2;

Figure 4 is a detail sectional view taken substantially on the plane of the line 4—4 of Figure 3 and showing the inside faces of the gears employed in driving the transfer arm and record grasping mechanism;

Figure 5 is a front elevational view of the record transfer mechanism in the position illustrated in Figures 1 and 2, with the engaging position of the record gripping members illustrated in dotted lines;

Figure 6 is a front elevational view similar to Figure 5, showing the parts in the position they assume at an intermediate point in the path of movement of the transfer arm;

Figure 7 is a view similar to Figures 5 and 6, showing the record transfer arm placing a record on the turntable at the completion of its transfer stroke;

Figure 8 is a plan view of the record transfer mechanism shown in the position of Figure 7;

Figure 9 is an elevational view of the side of the transfer mechanism adjacent the turntable, the view showing the mechanism of Figure 5 as viewed from the right side thereof;

Figure 10 is an elevational view of the transfer mechanism as viewed from the record magazine, the view showing the structure of Figure 5 as viewed from the left hand side thereof;

Figure 11 is an elevational view of the side of the transfer mechanism adjacent the magazine, with the transfer arm in the position it assumes as a record is placed on the turntable, the view showing the structures of Figures 7 and 8 as viewed from the left hand side thereof;

Figures 12 and 13 are detail sectional views through the record transfer mechanism, the views being taken substantially on the plane of the line 12—12 of Figure 9, with the several coacting parts shown in disengaged position in Figure 12 and in record grasping position in Figure 13;

Figure 14 is a central sectional view through the transfer mechanism and the driving gears, the view being taken substantially on the plane of the line 14—14 of Figures 1, 2, 5 and 15; and Figure 15 is a rear elevational view similar to Figure 2 but showing the driving gears of the mechanism in an intermediate position through which they pass as a record is being engaged by the transfer arm and is about to be transported to the turntable.

The transfer mechanism disclosed herein serves to transport the record discs from the magazine, generally designated as 36, to the turntable 101, and to return the record to the magazine when the playing has been completed. In so doing, it performs the following functions:

A. On the record delivery stroke (1) Grips the record;
(2) Transports it clockwise, as viewed from the front, about an axis in a plane normal to the plane of the record in order to move it to the turntable;
(3) Turns it either counterclockwise or clockwise as viewed from the top, about an axis in the plane of the record, in order to place either the front or the rear of the record, as desired, in horizontal playing position;
(4) Places the record on the turntable at the end of these movements;
(5) Releases the record.

B. On the record return stroke (1) Grips the record;
(2) Transports it counterclockwise back to the magazine;
(3) Turns it in the reverse direction from that in which it was turned on delivery, in order to return it to its vertical storing position in the magazine;
(4) Places the record back in the magazine at the end of these movements;
(5) Releases the record.

The parts of the mechanism by which the record disc gripping and releasing functions are performed are first described. The transfer mechanism 99 is located centrally on base 35 (Figure 1). It comprises a transfer barrel 287, having the general shape of pipe-junction, rotatably mounted on a bifurcated pedestal 288 having upstanding journal posts 289 and 290 (Figures 8–11). These posts are apertured to provide a pair of aligned bearings for a hollow tubular shaft 291 rotatably mounted within the pivotal (front-back) bore of the barrel (Figure 14). This shaft has two circular end bearing portions connected by two integral diametrically opposed intermediate portions 292, 293 (Figures 12 and 13). Portions 292, 293 act as a rectangular cam, rotatably mounted in the pivotal axis of the barrel 287 (Figure 14), for spreading tubular sleeves 294 and 295, rotatably and slidably mounted in the transverse bore of the barrel (Figures 12 and 13). This cam is of the same length as the diameter of the transverse bore. Sleeve 294 is rigidly secured to the outer arcuate grooved record gripper member 120 by a clamp 299, and sleeve 295 is rigidly secured to the inner grooved gripper member 296. That is, sleeve 295 is rigidly fitted and secured to the coaxial tubular extension 297 of mushroom 298, and this extension is in turn rigidly keyed at 300 to a rectangular shaft 301. Shaft 301 is concentrically mounted in the transverse bore of the barrel. It passes freely between cam portions 292 and 293 (Figure 14), and slidably through a complementary rectangular aperture in the closed end of sleeve 294 and is rigidly secured to the coaxial tubular extension 302 of inner gripper 296. The last named extension is slidably mounted within sleeve 294. A helical compression spring 303, mounted axially between the inner annular face of extension 302 and the opposed interior flange of sleeve 294, tends always strongly to force the sleeves 294 and 295 together and gripper 296 toward the end block 304 (Figure 1) of gripper 120, i. e., to force the grippers into record-gripping position. Now elements 296, 302, 294, 299, 303, 120, 295, 298, 297, 300, 301 always rotate in synchronism relative to barrel 287 and about the transverse bore axis of the barrel 287, but the rigid group of elements 120, 299, 294, is axially movable with respect to the other rigid group 296, 302, 295, 298, 297, 300, 301. In other words, the two groups have but one degree of limited freedom with respect to each other. Angular displacement between the groups is prevented by the fact that rectangular shaft 301 cannot turn relative to its rectangular aperture in sleeve 294. It will be seen that this rotational synchronism permits mushroom 298 to determine which side of a record will be placed on the turntable.

Figure 12 shows the positions of the parts when a record is about to be grasped on the delivery stroke. The positions of cam portions 292 and 293 are such as to spread the grippers. Figure 13 shows the conditions when the record has been grasped. Shaft 291 has rotated clockwise, as viewed from the front, and the high surfaces of the rectangular cam are now so positioned that spring 303 forces the grippers together. It is important to note that rotation of shaft 291 relative to the barrel, produced this effect. It follows that, if barrel 287 and its contents as a whole be further rotated clockwise, as viewed from the front, without rotating shaft 291 relative to the barrel, the record disc will remain securely gripped during transportation to the turntable. It also follows that, if, after the record is placed on the turntable, shaft 291 is rotated still further clockwise, as viewed from the front, relative to the barrel, cam surface 292 will then move sleeve 295 and cam surface 293 will then move sleeve 294, so that the record disc will be released by spreading of the grippers. In short, the gripping and releasing functions are accomplished by clockwise motions of shaft 291 relative to barrel 287, as viewed from the front at the beginning and end of the delivery stroke. Conversely, the gripping and releasing functions are accomplished by counterclockwise motions of the shaft 291 relative to barrel 287 and within its pivotal bore (Figure 14) at the beginning and end of the return stroke.

The parts by which the record-disc transporting functions are accomplished and by which the last named motions are produced are next described.

Particular reference is made to Figures 5 to 8, inclusive. Shaft 291 is rigidly secured to a cam gear 305 by a screw 306 (Figure 14). Gear 305 is driven by a driving gear 307 (Figures 2 and 15). Figure 15 shows the relative positions of these gears near the beginning of the delivery stroke but at the end of the record-gripping portion of that stroke. Gear 307 is the origin of the motion train. At the beginning of the delivery stroke, gear 307 rotates clockwise, as viewed from the rear (Figure 2). Its leading lobe-shaped teeth 326 cooperate with a complementary recess 327 on gear 305 and turns the last-mentioned gear slightly counterclockwise, as viewed from the rear, before teeth 310 of gear 307 intermesh with teeth 311 of gear 305. During the interval between the abutment of elements 308, 309 and the intermeshing of teeth 310, 311, shaft 291 (Figure 12) is rotated clockwise, as viewed from the front, from the position shown in Figure 12 to the position shown in Figure 13. Spring 303, since it tends by push-pull action to draw sleeves 294 and 295 together, cooperates in producing this result. Note that the spring alone is not relied upon to turn shaft 291, but cooperation of the spring and the action of abutments 308, 309 assures secure gripping of the record. Shortly after the time that teeth 310 of gear 307 mesh with teeth 311 of gear 305, teeth 310 (Figure 4) also mesh with teeth 312 of transfer gear 313. Gear 313 is mounted on shaft 291 in such a way that the shaft can rotate relative to it, but is rigidly secured to barrel 287 by a crank pin 314 which is located radially inwardly of barrel 287 but outwardly of journal post 289 (Figures 2, 8, 10 and 15). Preferable numbers of teeth are: fifteen for gear 307 (not including teeth 316 and 326); sixteen for gear 305 (not including depressions 327 and 317); twelve for gear 313, with a land at each peripheral end of the teeth.

Figure 5 illustrates the motions of the parts in gripping a record disc. Power is applied to driving gear 307 by its rigidly fitted shaft 347 (Figure 14), which is in turn driven by transfer motor 100 through a gear reduction 348, a sprocket 349, a roller chain 350, and a sprocket 351 (Figure 1). Continued rotation of gear 307 in a clockwise (as viewed from the rear), direction causes gear 313, gear 305, barrel 287, the contents of the barrel and the grippers 296 and 120 to rotate in a counterclockwise (as viewed from the rear) direction about the pivotal axis of the barrel from the position illustrated in Figure 5 through the position illustrated in Figure 6 and to the terminal position illustrated in Figures 7 and 8. At the end of this phase of mechanical operation, gear teeth 310 clear gear teeth 311 and 312, the abutment of one of the slotted arms 320 or 321 of clamp 299 (Figure 7) against a complementary stop 322, integral with pedestal 288 and the abutment of end block 304 (Figure 1) against rest 154 on base 35 stop the motion of gear 313 and further transportation of the record disc. In Figure 7 slotted arm 320 of clamp 299 is shown in abutment with stop 322 (when the front side of a record is placed in playing position, slotted arm 321 strikes stop 322).

However, the motion of gears 305 and 307 and the transfer motor continues until the narrow lobe-shaped tooth 316 of gear 305 enters the complementary recess 317 of gear 307. In other words, gear 305 continues its rotation for a slight interval after gear 313 has ceased to rotate. This is accomplished by the arcuate projecting tooth 316 (Figure 15), which bears on the curved side of arcuate depression 317, so that gear 307 continues to turn gear 305 after gear 313 has stopped. Elements 316 and 317 constitute an over-center driving means. During this interval, cam portion 293 moves sleeve 294 and cam portion 292 moves sleeve 295 (Figure 12). As indicated above, the purpose of this additional clockwise (as viewed from the front) rotation of gear 305 and shaft 291 relative to barrel 287 is to spread the grippers 120, 296 and to release the record when it is on the turntable.

The maintenance of a firm grip during transportation of the record from the rack to the turntable is assured for the reason that during the synchronized rotation of gears 305 and 313 relative rotation of shaft 291 and barrel 287 is positively prevented.

On the record return stroke, the following events occur: Gear 307 starts to turn counterclockwise, as viewed from the rear (Figure 15), tooth 316, working in recess 317, forces gear 305 to turn, so that shaft 291 turns clockwise, as viewed from the rear, and again assumes the position shown in Figure 13; the played record disc is grasped by grippers 296 and 120; teeth 310 on gear 307 engage teeth 311 on gear 305 and then teeth 312 on gear 313 and cause both gears 305 and 313 to turn, so that barrel 287 is also turned clockwise, as viewed from the rear, while the record disc remains firmly grasped; end 304 of gripper 120 comes to rest against stop 325 (Figure 1); teeth 310 disengage teeth 311 and 312 and gear 313 stops; gears 307 and 305 continue to run until surfaces 308 and 309 almost touch, whereby shaft 291 continues to rotate clockwise, as viewed from the rear, and finally assumes the position shown in Figure 12 to spread the grippers 120, 296; the record disc is thus returned to its compartment and released. An over-center driving means comprising arcuate projecting tooth 326 in gear 307 and a complementary arcuate depression 327 in gear 305 is provided, thus assuring ultimate close clearance between surfaces 308, 309 at the end of this record-return phase, and continued motion of gears 307 and 305 after gear 313 has stopped.

It will be observed that gear 305 always turns before gear 313 and continues to turn after gear 313 has stopped. This action assures gripping of the record disc at the beginning of each stroke and release at the end. A stop pin 329 (Figure 14) is provided in order to prevent possible overruns of the transfer mechanism. Pin 329, fitted in an aperture in journal arm 289, is struck by one side of pin 330, integral with gear 307, at the end of the record-return phase of operation. Pin 329 is struck by the other side of pin 330, at the end of the record-delivery phase of operation. Gear 307 rotates more than 340° during its cycle of operation, while gear 313 rotates on the order of 180°.

The over-center effects are obtained by slipping of the surfaces 326—327 and slipping of the surfaces 316—317.

When barrel 287 is moving, the eighth tooth of gear 307 is between the sixth and seventh tooth of gear 313 and between the eighth and ninth teeth of gear 305. At the end of record return the first regular tooth on gear 307 does not engage any of teeth 312 at all, being of narrower width than the other teeth 310. This first tooth passes clear of flange 331 (Figures 4 and 14). Similarly, at the end of record delivery, the last regular tooth on gear 307 does not engage any of teeth 312 and passes clear of flange 331.

In short, record disc transportation and delivery to the turntable are accomplished by clockwise, as viewed from the front, rotation of gear 313 and barrel 287 during the record delivery stroke. Conversely, record disc take-off from the turntable and return to the rack are accomplished by rotation of that gear and the barrel during the record return stroke, in a counterclockwise direction, as viewed from the front.

Thus it will be seen that there are herein disclosed in a record changer mechanism of the type including a pair of gripper members 296, 120, a pivotally mounted barrel 287, two sleeve members 294, 295 for actuating the gripping members and slidably mounted in the barrel, means including a first gear 305 and a cam 291, 292, 293 mounted for axial rotation relative to the barrel for contracting or releasing the grippers, a second gear 313 concentric with the first gear 305 and rigidly secured to the barrel 287 for rotating the barrel about its pivotal axis, a third and driving gear 307 for joint or several rotation with the first and second gears 305 and 313, said first (305) and third (307) gears having cooperating leading (309, 308) and trailing (323, 324) abutments and cooperating teeth (311, 310) and over-center driving means (326–327, 316–317) intermediate those abutments, said second gear 313 and said third gear 307 having cooperating teeth (312, 310), whereby an initial rotation of said third gear causes the leading abutment 308 to cooperate with the leading abutment 309 on said first gear 305 to turn said first gear alone and to contract said grippers on a record, whereby further rotation of said third gear 307 causes its gear teeth 310 to engage the gear teeth (311, 312) on said first and second gears and to turn both of said gears and said barrel about the pivotal axis of the barrel until the gear teeth on said third gear clear the teeth on said first and second gears, thereby imparting motion to a gripped record while at the same time preventing rotation of the first gear (305) relative to the barrel 287, means (299, 314, 315, 322) for limiting the motion of the second gear (313), said first (305) and third (307) gears continuing to turn and to be driven over-center relative to said second (313) gear to release said grippers when said record has been moved to a desired position and until their trailing abutments 323 and 324 almost touch, said leading and trailing abutments being adapted to interchange functions whereby when the direction of rotation of said third gear is reversed, a record disc is gripped and moved from the turntable back to the rack.

Reference is now made specifically to Figures 5 to 11, inclusive, in describing the parts of the transfer mechanism by which the record-disc turning functions are performed. As noted above, mushroom 298 determines which side of a record will be placed on the turntable, for the reason that mushroom 298, grippers 120 and 296 and the mushroom-gripper subassembly are mounted for independent limited rotation about the transverse bore of barrel 287. During the record-delivery phase, the transfer mechanism parts progress from the position shown in Figure 5 to that shown in Figure 15, then through the position shown in Figure 6 to the position illustrated in Figures 7 and 8. Independent rotation of the mushroom 298 relative to barrel 287 is initially restrained during the record-delivery phase by element 322 (Figures 12 and 13) cooperating with groove 332 in the mushroom. After the Figure 6 position is attained, the mushroom is released.

At a later time during that phase, one of pins 333, 334 enters its appropriate one of the cam grooves 335, 336 of mushroom 298, as clearly shown in Figure 6, as groove 332 clears the guiding element 322. The entry of pin 333 into groove 335 causes the grippers to rotate, independent of barrel 287, in a counterclockwise direction as viewed from the top. Similarly, the entry of pin 334 into groove 336 causes the grippers to be turned in a clockwise direction as viewed from the top. Therefore, the rear side of a selected record is to be played when pin 333 is projecting into one (335) of the cam grooves on the mushroom and the front side of the record is played when pin 334 is projecting into the other groove 336. The operation of the cross bar 118 of the magazine 36 and the tail 116 of rocker plate 114 is such that when the magazine 36 is moving toward the rear, the rocker plate is in the counterclockwise position (viewed from top) as shown in Figure 10. The description now proceeds on the assumption that pin 333 is projecting into groove 335. Continuation of the delivery phase following the conditions illustrated in Figure 6 causes pin 333, which has established a smooth line contact with the outer or front surface of the groove 335, to approach the terminus 337 of that groove, to exert a torsional force relative to an axis in the plane of the record disc (i. e., the transverse bore axis of barrel 287), and to impart to the subassembly of mushroom and grippers a counterclockwise turn as viewed from the top. Still further movement of barrel 287 causes the opposite or normally inner surface of groove 335 to come into contact with pin 333, and at the end of the record-delivery stroke the transfer mechanism parts assume the positions illustrated in Figures 7, 8 and 11. It will be seen that pins 333 and 334 and grooves 335 and 336 converge at a common locus, so that the action of the pin and mushroom is equivalent to bevel gearing.

Reversal of barrel 287 during the record-return phase causes a clockwise rotation relative to the transverse bore axis of the barrel, as viewed from the top, to be imparted to the mushroom and gripper subassembly.

The operation of the mushroom and gripper subassembly when pin 334 is projecting into groove 336 is apparent from the foregoing description. In that case, the record is turned clockwise about an axis in its plane, as viewed from the top, on the delivery stroke and counterclockwise, as viewed from the top, on the record-return stroke.

The rocker plate 114 is pivotally mounted (Figure 11) at 339 on the pin block 340, secured to pedestal 288. The pin block has two integral cylinders 341 and 342 and the converging pins 334, 333, tend to be biased outwardly in the direction of divergence by compression springs 343, 344, respectively. One of the pins is pressed and secured inwardly by the adjacent curved surface of one of the overlying arms 345, 346 of rocker plate 114 when the other pin is outwardly biased. The rocker arms are so arranged that they are rotatable positively to force and retain either of the pins toward the mushroom 298. Thus it is apparent how the record-disc turning functions are performed and how the playing of either the front and the rear side of the record is made dependent upon the direction of magazine motion.

Each of the pins 333, 334 which determine the side of a selected record to be played is essentially one tooth of a hypothetical tooth on the mushroom. The principal advantage of this characteristic of a bevel gear drive is that line contact exists throughout the phase of operation during which the cam grooves and pins come into play, thus obviating the short duration if merely point contact existed. With this construction of converging pins, the initial contact of the pins is angular with respect to the contact surfaces 335, 336 and impacts are substantially reduced below those which would otherwise prevail. The maximum acceleration imposed on the record in making the necessary ninety degree twist has been kept to a minimum which is considerably below that developed in prior art record changers.

*Operation*

Power is applied to shaft 347 from transfer motor 100, through sprocket 349, chain 350 and sprocket 351 (Figure 1). Gear 307 turns clockwise, as viewed from the rear (Figure 15). Surfaces 308-309 cooperate to turn gear 305 clockwise, as viewed from the front (Figure 5). Shaft 291 turns and sleeves 294-295 are pushed together by springs 303 (Figure 12), forcing grippers 120, 296 together, whereby the record is securely gripped (Figure 13). Teeth 310 pick up teeth 311 and 312 (Figures 4 and 14) and barrel 287 is rotated clockwise, as viewed from the front, transporting the record toward the turntable. As the barrel is rotated, guide 322 (Figures 13 and 14) and groove 332 keep gripper 120 in the vertical plane until pin 333 enters groove 335 in mushroom 298 (Figure 11). Then the grippers and record are turned counterclockwise as viewed from the top (Figure 6), so that the rear side of the record is placed in playing position. Finally, slotted arm 320 embraces element 322 (Figures 7 and 8) and gear 313 and barrel 287 stop as end block 304 of gripper 120 strikes rest (Figure 1) 154. Gears 307 and 305 continue to run until the record is released by the gripper arm 320 slipping on element 322 as the record is released. The record is now on the turntable. The record is played and the tone arm traverses the disc. Finally the tone arm switch (not shown) is closed and a relay energized, so that the transfer motor 100 (Figure 1) is reversed.

Then the record 40 is again gripped as gear 307 turns clockwise, as viewed from the front, its surface 324 cooperating with surface 323 of gear 305 to turn that gear 305 counterclockwise, as viewed from the front. Shaft 291 is also turned and the grippers are closed. Teeth 310 again pick up teeth 311 and 312 and barrel 287 is turned about its pivotal axis. Further, pin 333 and groove 335 on mushroom 298 cooperate to twist the record clockwise as viewed from the top and the record is returned to the rack and released. As end 304 of gripper 120 strikes rest 325 gear 313 stops. Gear 305 (Figure 15) continues its counterclockwise, as viewed from the front, motion long enough to release the grippers (Figure 2). This brings the arcuate outer surface of the projecting tooth 326 of the gear 307 into sliding engagement with the end tooth 311 of the gear 305, so that the tooth 326 serves as a self-locking cam holding the grippers out of contact with the records. It is to be noted, however, that gear 307 need not be precisely positioned to assure disengagement of the record grippers, and it follows that considerable leeway as to the exact stopping position of this gear and its driving motor may be tolerated without disrupting the normal cycle of operations. This eliminates any need for unduly precise means for stopping the motor at the end of the transfer arm stroke. The tooth 316 performs the same function at the opposite end of the transfer arm stroke.

From the foregoing it will be apparent that the device disclosed herein provides a record transfer mechanism of extremely simple design and construction, yet capable of long continued, trouble-free operation, not only under normal conditions, but also under conditions involving a considerable amount of mistreatment and abuse. In short, the invention provides a much simpler mechanism than heretofore devised for the purpose, yet one of such design and construction that it is not likely to be damaged by improper manipulation or inadequate care. The machine cannot easily be jammed by accident in normal operation, nor can the proper sequence of operations of the various coacting parts be easily disrupted by vibration or accidental physical shocks. Even deliberate improper manipulation of the various operating parts is unlikely to interfere with its proper functioning, since the circumferential transfer arm which encircles and cradles the record has its driving means so constructed that the arm is positively held against accidental displacement when it is in a position of rest at the magazine or at the turntable, as well as during the time the arm is moved from the magazine to the turntable in the record transfer operation.

The record grasping mechanisms operate automatically with the movement of the driving mechanism of the transfer arm, while the arm and its coacting parts are so related that the starting and stopping points of the arm itself are precisely controlled, yet there is some leeway as to exact point at which the driving mechanism may stop. It follows that extreme precision in the control of the motor is not required. Thus the record may be delivered to the turntable or returned to the magazine merely by reversing the direction of rotation of the motor. With all of the above, the mechanism for engaging the record and transporting it to the turntable and back is controlled in such a manner that all movements of the record are smoothly executed at uniform rates of acceleration and deceleration, with a driving mechanism wherein the meshing relationship between the driving gears is entirely smooth and positive, so that any possibility of jamming of the driving parts is eliminated.

Having thus described our invention, what we claim as new and desire to secure by United States Letters Patent is:

1. In a record changer transfer mechanism of the type including a pair of gripper members, a pivotally mounted barrel, two sleeve members slidably mounted in the barrel for actuating the gripper members, means including a first gear and a cam mounted for axial rotation relative to said barrel for contracting or releasing said grippers, a second gear concentric with said first gear with a connecting pin between the second gear and the transfer barrel for rotating said barrel about its pivotal axis, a third gear for jointly or severally driving said first and second gears, said first and third gears having cooperating leading and trailing abutments and cooperating teeth and over-center driving means intermediate said abutments, said second gear and said third gear having cooperating teeth, whereby initial rotation of said third gear causes its leading abutment to cooperate with the leading abutment on said first gear to turn said first gear only and to contract said grippers on a record, whereby continued rotation of said third gear causes its gear teeth to engage the gear teeth on said first and second gears and to turn both of said gears and said barrel about the pivotal axis of the barrel until the gear teeth on said third gear clear the gear teeth on said first and second gears thereby imparting motion to a gripped record while at the same time preventing rotation of said first gear relative to said barrel, means for limiting the motion of said second gear, said first and third gears continuing to turn and to be driven over-center relative to said second gear to release said grippers when said record has been moved to a desired position and until their trailing abutments almost touch, said leading and trailing abutments being capable of interchange of functions whereby when the direction of rotation of said third gear is reversed a record may be gripped and moved from the last-mentioned position to its initial position.

2. In a record transfer mechanism, the combination of a pair of bearings in axial alignment and spaced apart from each other; a pivoted transfer barrel between said bearings, a swinging circumferential record arm carried on said transfer barrel with a pair of cam actuated grippers on said arm; a single cam shaft extending between said bearings and journaled therein, with a pivotal bore in the transfer barrel journaled directly on the cam shaft; with driving means consisting of a cluster of three rotatable gears, including a single driving gear meshing directly with a cam gear and a transfer gear; said cam gear and transfer gear being mounted in coaxial face to face relation but independently rotatable with respect to each other, with the cam gear affixed directly to the cam shaft and the transfer gear connected to the transfer barrel by a crank pin extending across one of the cam shaft bearings; said driving gear having a series of relatively wide teeth meshing with both the cam gear and the transfer gear to lock them together and move them simultaneously, an arcuate cam portion on the driving gear engaging the transfer gear to lock it in stationary position, and a single relatively narrow tooth on the driving gear at each end of said series of wide teeth, said narrow tooth being adapted to mesh with the cam gear only to move the cam shaft relative to the transfer barrel at each end of their cycle of movement.

3. In a record transfer mechanism, the combination of a pivoted transfer barrel; a swinging circumferential record arm carried on said transfer barrel with a pair of cam actuated grippers on said arm; a single cam shaft, with a pivotal bore in the transfer barrel journaled directly on the cam shaft; with driving means consisting of a cluster of three rotatable gears, including a single driving gear meshing directly with a cam gear and a transfer gear; said cam gear and transfer gear being mounted in coaxial face to face relation but independently rotatable with respect to each other, with the cam gear affixed directly to the cam shaft and the transfer gear connected to the transfer barrel by a crank pin extending across one of the cam shaft bearings; said driving gear having a series of relatively wide teeth meshing with both the cam gear and the transfer gear to lock them together and move them simultaneously, and a single relatively narrow tooth on the driving gear at each end of said series of wide teeth, said narrow tooth being adapted to mesh with the cam gear only to move the cam shaft relative to the transfer barrel at each end of their cycle of movement.

4. In a record transfer mechanism, the combination of a pair of bearings in axial alignment and spaced apart from each other; a pivoted transfer barrel between said bearings, a swinging circumferential record arm carried on said transfer barrel with a pair of cam actuated grippers on said arm; a single cam shaft extending between said bearings and journaled therein, with a pivotal bore in the transfer barrel journaled directly on the cam shaft; with driving means consisting of a cluster of three rotatable gears, including a single driving gear meshing directly with a cam gear and a transfer gear; said cam gear and transfer gear being mounted in coaxial face to face relation but independently rotatable with respect to each other, with the cam gear affixed directly to the cam shaft and the transfer gear connected to the transfer barrel; said driving gear having one set of teeth meshing with both the cam gear and the transfer gear to lock them together and move them simultaneously, a cam engaging the transfer gear to lock it in stationary position, and at least one additional tooth adapted to mesh with the cam gear only to move the cam shaft relative to the transfer barrel at each end of their cycle of movement.

5. In a record transfer mechanism, the combination of a pivoted transfer barrel; a swinging circumferential record arm carried on said transfer barrel with a pair of cam actuated grippers on said arm and a cam shaft; with driving means consisting of a cluster of three rotatable gears, including a single driving gear meshing directly with a cam gear and a transfer gear; said cam gear and transfer gear being mounted in coaxial face to face relation but independently rotatable with respect to each other, with the cam gear affixed to the cam shaft and the transfer gear connected to the transfer barrel; said driving gear having one set of teeth meshing with both the cam gear and the transfer gear to lock them together and move them simultaneously, and at least one additional tooth adapted to mesh with the cam gear only to move the cam shaft relative to the transfer barrel at each end of their cycle of movement.

References Cited in the file of this patent

UNITED STATES PATENTS

| Number | Name | Date |
| --- | --- | --- |
| Re. 21,514 | Green | July 23, 1940 |
| 2,527,936 | Kasnowich | Oct. 31, 1950 |
| 2,545,361 | Kasnowich | Mar. 13, 1951 |
| 2,546,845 | Andres | Mar. 27, 1951 |